(12) United States Patent
Holland

(10) Patent No.: US 8,963,938 B2
(45) Date of Patent: Feb. 24, 2015

(54) MODIFIED QUALITY OF SERVICE (QOS) THRESHOLDS

(71) Applicant: Apple Inc., Cupertino, CA (US)

(72) Inventor: Peter F. Holland, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 13/744,637

(22) Filed: Jan. 18, 2013

(65) Prior Publication Data

US 2014/0204100 A1  Jul. 24, 2014

(51) Int. Cl.
*G06F 13/00* (2006.01)
*G09G 5/39* (2006.01)
*G06T 1/20* (2006.01)

(52) U.S. Cl.
CPC .................................. *G06T 1/20* (2013.01)
USPC .......................................... 345/537; 345/531

(58) Field of Classification Search
CPC ............. G06T 1/20; G06T 1/60; G06F 13/00; G09G 5/39
USPC ........................ 345/506, 536, 530, 531, 537
See application file for complete search history.

(56) References Cited

U.S. PATENT DOCUMENTS

| | | | |
|---|---|---|---|
| 6,804,757 B2 | 10/2004 | Weber | |
| 7,657,706 B2 | 2/2010 | Iyer et al. | |
| 7,975,192 B2 | 7/2011 | Sommer et al. | |
| 8,125,490 B1 | 2/2012 | Vaidya et al. | |
| 8,314,807 B2 | 11/2012 | Biswas et al. | |
| 2011/0169849 A1 | 7/2011 | Bratt et al. | |
| 2012/0072679 A1 | 3/2012 | Biswas et al. | |
| 2012/0131306 A1* | 5/2012 | Bratt et al. | 711/205 |
| 2012/0206474 A1* | 8/2012 | Holland et al. | 345/589 |

FOREIGN PATENT DOCUMENTS

CN  101419579  4/2009

OTHER PUBLICATIONS

David Andrew Roberts, "Efficient Data Center Architectures Using Non-Volatile Memory and Reliability Techniques", University of Michigan, 2011, pp. 1-170.
U.S. Appl. No. 13/775,641, filed Feb. 25, 2013, Peter F. Holland et al.

* cited by examiner

*Primary Examiner* — Jacinta M Crawford
(74) *Attorney, Agent, or Firm* — Lawrence J. Merkel; Meyertons, Hood, Kivlin, Kowert & Goetzel, P.C.

(57) ABSTRACT

In an embodiment, a display pipe processes video data for visual display. The display pipe may read the video data from memory, and may employ QoS levels with the memory requests to ensure that enough data is provided to satisfy the real time display requirements. The display pipe may include a pixel buffer that stores pixels that are ready for display. Additionally, the display pipe may include one or more input buffers configured to store input video data to be processed and/or one or more output buffers configured to store processed data that is ready for blending into the final pixels for display. The display pipe determine a number of output equivalent pixels in the data in the input and output buffers, and may consider those pixels as well as the ready pixels in the pixel buffer in determining the QoS levels for requests.

20 Claims, 5 Drawing Sheets

MODIFIED QUALITY OF SERVICE (QOS) THRESHOLDS

BACKGROUND

1. Field of the Invention

This invention is related to the field of digital systems and, more particularly, to handling quality of service (QoS) issues in memory accesses generated within the system.

2. Description of the Related Art

Most digital systems include a variety of devices that need access to memory (e.g. processors, peripherals, etc.). For example, a processor accesses memory to read instructions for execution, to read and write data during execution of the instructions, etc. Various devices read and write data as well. For example, video/graphics devices write data representing images to be displayed, read data for display, etc. A network device reads and writes packet data to/from memory. A mass storage device writes stored data being transferred to memory, or reads memory data being transferred to the mass storage device.

With numerous devices potentially accessing memory, a mechanism for selecting among requests, ordering requests from different requestors, etc. is needed. The mechanism needs to balance performance requirements of the requestors (which differ, depending on the type of requester) as well as providing good memory performance (e.g. grouping operations to the same page of memory to improve memory bandwidth utilization and reduce average power consumption, etc.).

Some devices are categorized as real-time devices. These devices are characterized by a need to receive data at a certain rate in real time, or erroneous operation may occur. For example, video data needs to be provided within the frame rate of the video, or visual artifacts may occur on the display. Similarly, audio devices are real time: if the audio data is not available at the audio rate, skips in the audio playback may occur. Other devices are non-real time, such as processors. Non-real time devices can perform better if data is provided more rapidly, but will not have erroneous operation if data is not provided as rapidly.

One mechanism that can be used to balance the requirements of real time and non-real time device is QoS. The real time device can be provided with several levels of QoS, with increasing levels of priority. As the need for data becomes more critical to prevent erroneous operation, the device can issue memory operations with higher levels of QoS. The memory controller can respond more rapidly to this higher QoS requests, preventing the erroneous operation that might otherwise occur. The non-real time deices can also be provided with QoS levels to rank against the real time QoS levels.

There are costs for issuing the higher QoS requests, at the system level. The memory controller may bypass other requests that might be more efficiently performed together (e.g. requests that are to an already-open page in the memory). Accordingly, overall system performance can suffer if the QoS levels of real time requests are increased too frequently. Because erroneous operation occurs for real time devices if their data needs are not met, the determination of which QoS level to use for a given memory operation is made conservatively (i.e. assuming a worst case scenario in terms of memory load from other requestors in the system). While such determinations can ensure that correct operation of the real time devices, the increase in QoS levels can occur more frequently then necessary if the worst case scenario is not in effect, reducing memory bandwidth utilization and increasing power consumption in the memory unnecessarily.

SUMMARY

In an embodiment, a display pipe includes circuitry configured to process video data (e.g. still images and/or video sequences) for visual display. The display pipe may be configured to blend one or more images and/or sequences to produce output frames. The display pipe may read the video data from memory for processing, and may employ QoS levels with the memory requests to ensure that enough data is provided to satisfy the real time display requirements. The display pipe may include a pixel buffer that stores pixels that are ready for display. Additionally, the display pipe may include one or more input buffers configured to store input video data to be processed and/or one or more output buffers configured to store processed data that is ready for blending into the final pixels for display. The display pipe may be configured to determine a number of output equivalent pixels in the data stored in the input and output buffers, and may consider those pixels as well as the ready pixels in determining the QoS levels for subsequent memory requests. In this manner, data that is already within the display pipe that has not yet been processed may be considered in determining the QoS levels to request. QoS levels may be increased less frequently for cases in which input data is available for processing, but is not yet ready for display.

In an embodiment, when the memory controller is heavily loaded with requests from other requestors in the system, the various buffers within the display pipe may be less likely to have data stored in them. That is, in the heavily loaded cases, the data provided to the display pipe may be processed quickly upon receipt, and the display pipe may be waiting for additional data. In less heavily loaded cases, the data may be provided to the display pipe more quickly and thus the data may be in buffers awaiting processing. Accordingly, the QoS thresholds in the display pipe may be set for the conservative case, but considering the data in the other buffers when comparing to the QoS thresholds may effectively adjust for the lighter load cases, and the QoS levels of the display pipe requests may be increased less frequently in lighter load cases.

While the display pipe is used as an example embodiment for the mechanisms describe herein, other devices that employ QoS may implement similar mechanisms. For example, other real time devices may implement similar mechanisms.

BRIEF DESCRIPTION OF THE DRAWINGS

The following detailed description makes reference to the accompanying drawings, which are now briefly described.

Figure 1:
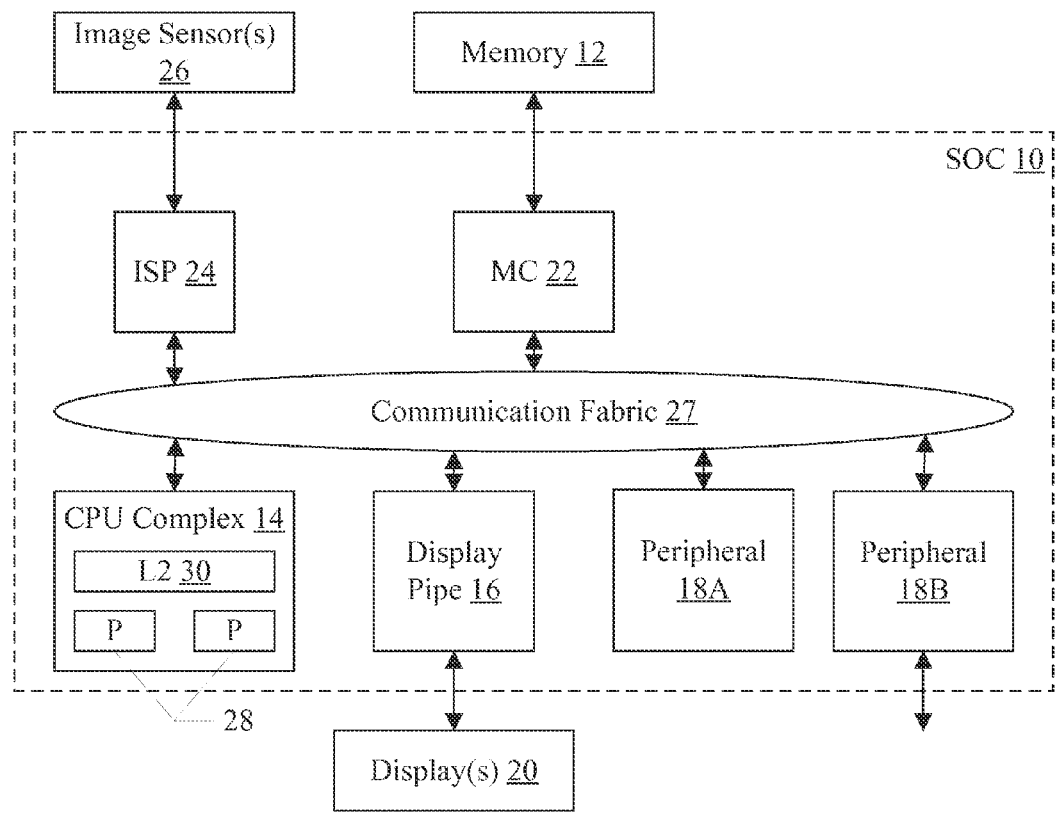
FIG. 1 is a block diagram of one embodiment of a system on a chip (SoC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an SOC 10 is shown coupled to a memory 12, one or more image sensors 26, and one or more displays 20. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, an image signal processor (ISP) 24, and a communication fabric 27. The components 14, 16, 18A-18B, 22, and 24 may all be coupled to the communication fabric 27. The memory controller 22 may be coupled to the memory 12 during use. Similarly, the ISP 24 may be coupled to the image sensors 26 during use and the display pipe 16 may be coupled to the displays 20 during use. In the illustrated embodiment, the CPU complex 14 includes one or more processors 28 and a level two (L2) cache 30.

The display pipe 16 may include hardware to process one or more static frames and/or one or more video sequences for display on the displays 20. Generally, for each source frame or video sequence, display pipe 16 may be configured to generate read memory operations to read the data representing the frame/video sequence from the memory 12 through the memory controller 22. Each read operation may include a QoS parameter that specifies the requested QoS level for the operation. The QoS level may be managed to ensure that the display pipe 16 is provided with data in time to continue displaying images without visual artifacts (e.g. incorrect pixels being displayed, "skipping", or other visually-identifiable incorrect operation). An initial QoS level may be used normally (e.g. a lowest level, in terms of priority). The QoS level may be increased as the potential to have erroneous operation due to running out of data increases. Thus, the QoS level may be determined based on the amount of data that the display pipe 16 has available.

In one embodiment, three QoS levels may be supported (green, yellow, and red, with increasing levels of priority over other operations). Other embodiments may support two levels or more than three levels. The green level may be the initial level, and may generally be considered as similar in priority to operations from other sources. The yellow level may be a higher level. Operations marked yellow may be performed first by the memory controller 22 (ahead of other operations), but may be grouped with other operations that are not yellow. The red level may be the highest level. Red operations may be performed first and may be performed even if other operations could be grouped together and performed more efficiently by the memory controller 22 before the red operations.

Each other requestor on the communication fabric 27 may provide QoS parameters for memory operations as well. Other real time devices, e.g. the ISP 24, may use a set of QoS levels similar to the ones described above for the display pipe 16. Non-real time devices, such as the processors 28 or various peripherals 18A-18B may also used a similar set of QoS levels and may be limited to the lowest priority level or levels. Alternatively, the non-real time devices may use a different set of QoS levels. In one embodiment, the non-real time devices may use a best effort level and a low latency level. The best effort level may be a low priority level, and the low latency level may sometimes be considered higher priority but may be treated as low priority if the memory controller 22 begins receiving too many yellow or red QoS levels from the display pipe 16 and/or the ISP 24.

The display pipe 16 may be configured to perform any type of processing on the image data (static frames, video sequences, etc.). In one embodiment, the display pipe 16 may be configured to scale static frames and to dither, scale, and/or perform color space conversion on the frames of a video sequence. The display pipe 16 may be configured to blend the static frames and the video sequence frames to produce output frames for display.

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SoC 10 (e.g. a smart phone or tablet) and/or may be a separately housed device such as a computer monitor, television, or other device.

The ISP 24 may be configured to receive image sensor data from the image sensors 26 and may be configured to process the data to produce image frames that may be suitable, e.g., for display on a display 20. The image sensors 26 may include cameras (e.g. charge coupled devices (CCDs), complementary metal-oxide-semiconductor (CMOS) sensors, etc.).

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or and interface to the other components of the system (e.g. an interface to the communication fabric 27).

The peripherals 18A-18B may be any set of additional hardware functionality included in the SOC 10. For example, the peripherals 18A-18B may include video peripherals such as video encoder/decoders, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory requests from the other components of the SOC 10 and for accessing the memory 12 to complete the memory requests. As mentioned above, the memory requests may include QoS parameters specifying QoS levels, and the memory controller 22 may sequence requests from the various requestors based at least in part of the QoS parameters. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
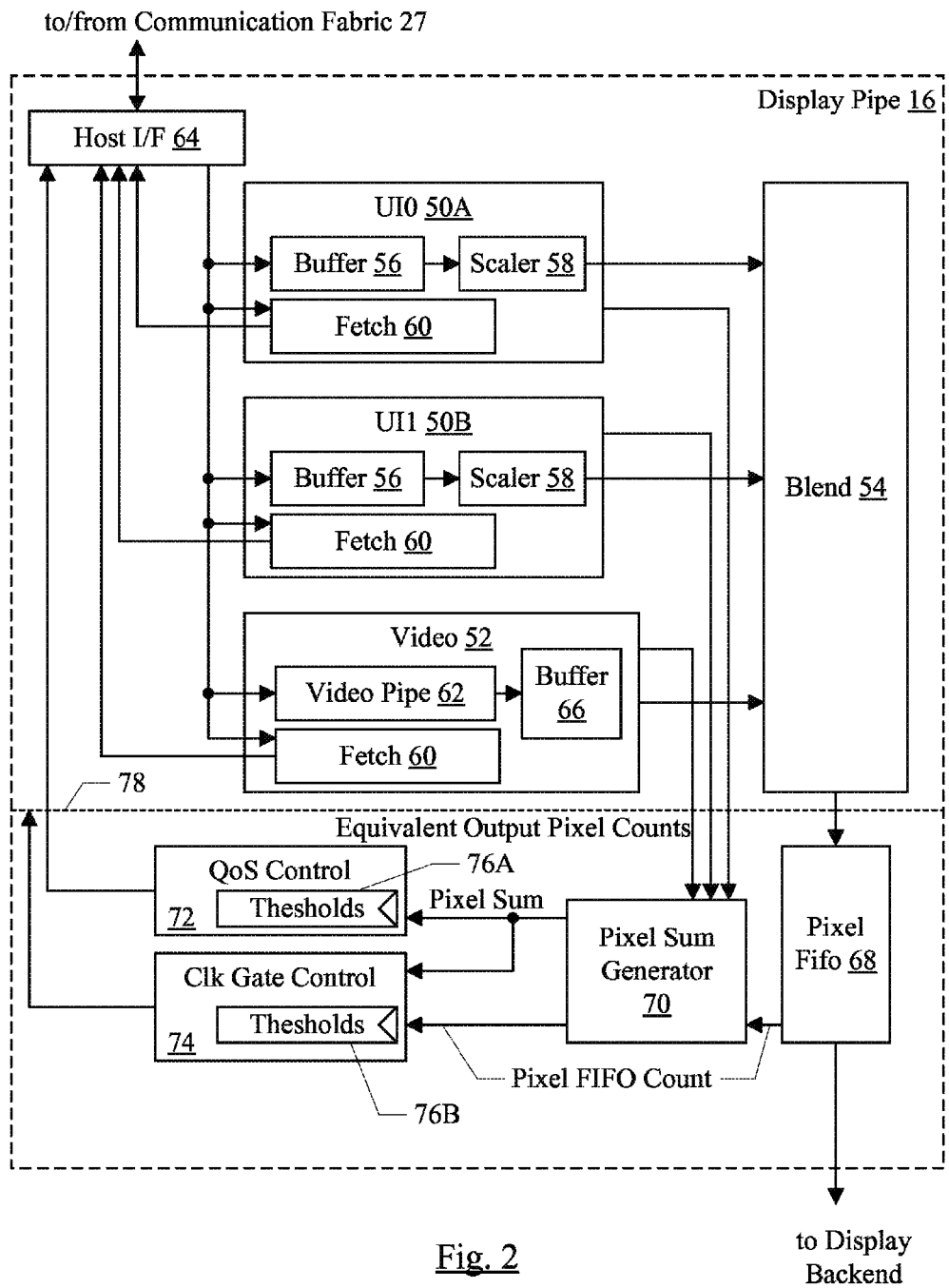
FIG. 2 is a block diagram of one embodiment of a display pipe shown in FIG. 1.

Turning now to FIG. 2, a block diagram of one embodiment of a portion of the display pipe 16A is shown. There may be additional circuitry (e.g. the display backend in FIG. 2) to directly interface to the display 20 to display pixels generated by the display pipe 16A. There may be multiple instances of the display pipe 16 for coupling to multiple displays 20. As shown in FIG. 2, the display pipe 16A may include one or more user interface (UI) units, two shown as UI0 50A and UI0 50B in this case. One or more video units such as video unit 52 may also be included, along with a blend unit 54. A host interface unit (host I/F) 64 may also be included. An output pixel buffer 68 (or a pixel first-in, first-out buffer (FIFO)) is shown. A pixel sum generator circuit 70, a QoS control circuit 72, and a clock gate control circuit 74 are also shown. Each of the QoS control circuit 72 and the clock gate control circuit 74 may include respective threshold registers 76A-76B.

In the illustrated embodiment, the host interface unit 64 may be coupled to the user interface units 50A-50B, the video unit 52, and the QoS control circuit 72. The user interface units 50A-50B and the video unit 52 may further be coupled to the blend unit 54 and the pixel sum generator circuit 70. The blend unit 54 may be coupled to the pixel FIFO 68, which may be coupled to the pixel sum generator circuit 70. The pixel sum generator circuit 70 may be coupled to the control circuits 72 and 74. The clock gate control circuit 74 may be configured to control clock gating in a portion of the display pipe 16A. Particularly, the portion above the dashed line 78 in FIG. 2 may be able to be clock gated.

The pixel FIFO 68 may be the interface to the display backend, which may control the display 20 to display the pixels generated by the display pipe 16A. The display backend may read pixels at a regular rate from the pixel FIFO 68 according to a pixel clock. The rate may depend on the resolution of the display as well as the refresh rate of the display. For example, a display having a resolution of N×M and a refresh rate of R frames per second may have a pixel clock frequency based on N×M×R. On the other hand, the pixel FIFO 68 may be written by the blend unit 54 as pixels are generated by the blend unit 54. In some instances, the rate at which the display pipe 16A generates pixels may be faster than the rate at which the pixels are read, assuming that data is provided to the display pipe 16A from the memory 12 quickly enough.

The pixels in the pixel FIFO 68 may thus be a measure of a margin of safety for the display pipe 16A before erroneous operation may be observed on the display 20. The QoS control circuit 72 may be configured to generate QoS levels based on the number of pixels in the pixel FIFO 68, e.g. as compared to one or more thresholds programmed into the thresholds register 76A. The clock gate control circuit 74 may similarly determine when to clock gate the display pipe 16A based on a threshold.

Additionally, the amount of data that is available within the display pipe 16A to generate additional pixels for the pixel FIFO 68 may be viewed as additional margin of safety. The display pipe 16A may be configured to estimate an equivalent number of output pixels that may be generated from the data, to add to the pixel count from the pixel FIFO 68. Since the data has not yet been converted to output pixels, the amount of data itself may not be directly comparable to a pixel count. For example, if the data is image data that is being scaled, then the number of pixels which result from the data may be greater than or less than the number of pixels represented by the data, based on the scale factor. Additionally, the pixel size (e.g. the number of bits or bytes of data per pixel used to represent the colors and the alpha scale value, if any) may affect the conversion from the amount of data to the equivalent output pixels. Accordingly, the amount of data may be converted to an estimated number of equivalent output pixels that are expected to result from processing the data.

In the illustrated embodiment, data may be buffered in the user interface units 50A-50B and the video unit 52. Each unit may provide an equivalent output pixel count estimated from the data in that unit as well as from various other attributes of the frame and/or its processing, such as pixel size and scale factor. In embodiments in which the blend unit 54 includes buffering, the blend unit 54 may also generate an equivalent output pixel count. The equivalent output pixel counts may be provided to the pixel sum generator circuit 70.

The pixel sum generator circuit 70 may be configured to add the pixel FIFO count from the pixel FIFO 68 to a smallest one of the equivalent output pixel counts to generate a pixel sum. That is, the margin of safety may be controlled by whichever unit has the least amount of output equivalent pixels. The pixel sum generator circuit 70 may thus be configured to select the smallest equivalent output pixel count and may add the selected count to the pixel FIFO count to generate the pixel sum. In other embodiments, each unit 50A-50B and 52 may provide an indication of the amount of data buffered therein (e.g. a byte count), and the pixel sum generator circuit 70 may be configured to generate the equivalent output pixel counts from the indications.

The QoS control circuit 72 may receive the pixel sum, and may be configured to compare the pixel sum to the thresholds programmed into the threshold register 76A. There may be a threshold for each level (except for the green level, since that is the normal level if all of the thresholds have been exceeded). Since emptying the pixel FIFO 68 is the event to be avoided, the lowest threshold that the pixel sum drops below may be the threshold that determines which QoS level to request. Thus, an embodiment that implements the green, yellow, and red QoS levels discussed above may include a red threshold and a yellow threshold. The red threshold may be the lowest threshold. If the pixel sum is less than the red threshold, the QoS control circuit 72 may generate the red QoS level. If the pixel sum is greater than the red threshold but less than the yellow threshold, the QoS control circuit 72 may generate the yellow QoS level. If the pixel sum is greater than the yellow threshold, the QoS control circuit 72 may generate green QoS level. The QoS control circuit 72 may provide the generated level to the host interface unit 64, which may transmit the QoS level with each memory read operation to the memory controller 22. In one embodiment, the QoS control circuit 72 may implement on and off thresholds to permit hysteresis in the changing between levels. That is, for each QoS level there may be an on threshold above which the pixel sum is to rise to increase the QoS level, and an off threshold below which the pixel sum is to drop to decrease the QoS level. In such embodiments, the current QoS level may be included in determining the QoS level for a request, in addition to the thresholds. Other embodiments may not implement hysteresis and may have one threshold level per QoS level. It is noted that embodiments which support hysteresis may be programmed to operate without hysteresis by setting the on and off thresholds to the same value.

In some embodiments, the consideration of the output pixel equivalents in other data within the display pipe 16A may be programmable. If the output pixel equivalents are disabled, the pixel sum generator circuit 70 may be configured to pass the pixel FIFO count as the pixel sum.

The clock gate control circuit 74 may similarly determine if clock gating may be performed based on one or more thresholds in the thresholds register 76B. In one embodiment, there may be a threshold to enable clock gating and another threshold to awaken from clock gating. The enable threshold may be compared to the pixel sum, similar to the discussion above with regard to the QoS control circuit 72. However, the awaken threshold may be compared to the pixel FIFO count in this embodiment. Since the data that is buffered in the units 50A-50B and 52 is not processed while these units are clock gated, it may be desirable to wake the units to process the data based only on the number of pixels in the pixel FIFO 68, ready to be delivered to the display. Based on the comparisons, the clock gate control circuit 74 may generate one or more clock gate control signals which may be distributed to clock gaters in the section of the display pipe 16A above the dashed line 78 in FIG. 2. Similar to the above discussion, the on and off thresholds may be programmed to the same value if desired.

Each user interface unit 50A-50B may include instances of a buffer 56, a scaler 58, and a fetch unit 60. The buffer 56 may be coupled to receive image data from the host interface unit 64 and to provide the data to the scaler 58. The scaler 58 may be configured to output pixels to the blend unit 54 with an alpha value for blending. The fetch unit 60 may be coupled to provide memory operations to the host interface unit 64 for transmission to the memory controller 22. The video unit 52 may include a video pipe 62, a video output buffer 66, and one or more fetch units 60. For example, the video unit 52 may include a fetch unit 60 for each image plane in the video sequence. The various image planes may describe the video image. For example, the image planes may be color planes (e.g. red, green, blue or Y, Cr, Cb). The fetch unit(s) 60 in the video unit 52 may be coupled to provide memory operations to the host interface unit 64. The video pipe 62 may be coupled to receive video image data from the host interface unit 64.

The buffers 56 may be input line buffers. That is, the buffers 56 may store lines of data corresponding to lines of the input frame. For vertical downscaling, data from adjacent lines of the input frame may be needed to generate each output pixel, and thus the line buffers may provide space to store data for processing. The data may be the color data for each pixel, as well as an alpha value for blending. Accordingly, as mentioned above, the equivalent output pixel count corresponding to the data in the buffers 56 may be affected by both the scale factor and the pixel size.

The buffer 66 may be an output buffer of video frame pixels. The pixels in the buffer 66 may already have been scaled, if applicable, and may be ready for blend to produce output pixels for the output pixel FIFO 68. Accordingly, the equivalent output pixel count for the buffer 66 may simply be the pixel count from the buffer 66.

Generally, the video data input to each of the units 50A-50B and 52 may describe the source image to be displayed. In an embodiment, the video data for a user interface image input to the units 50A and 50B may include pixel data and an alpha value for blending. The pixel data may describe a color for each pixel. The scaled pixels may be provided as output pixels from the user interface units 50A and 50B to the blend unit 54, along with the alpha values. In an embodiment, the user interface units 50A-50B may support programmable active regions in the source image. The active regions may define the only portions of the source image to be displayed. In an embodiment, the user interface units 50A-50B may be configured to only fetch data within the active regions. Outside of the active regions, dummy data with an alpha value of zero may be passed as the pixel data.

In one embodiment, the video pipe 62 may receive fetched video data describing a sequence of frames to be displayed at a frame rate specified for the video sequence. In an embodiment, the video sequence data may be in YCbCr format, and the video unit 62 may be configured to color space cover the frames to RGB for blend with the frames from the user interface units 50A-50B. The video pipe 62 may insert random noise (dither) into the data and may optionally scale the data in one or both of vertical and horizontal directions.

The blend unit 54 may receive frames of pixels from the user interface units 50A-50B and the video unit 52, and may be configured to blend them together layer by layer. The final resultant pixels may be queued in the output pixel FIFO 68. The lowest level layer in the blend unit 54 may be defined as the background color. Layer 1 may blend with layer 0. The next layer, layer 2, may blend with the blended layers 0 and 1, and so on until all the layers are blended.

Each of the units 50A-50B and 52 may include pipelined hardware that performs the operations assigned to that unit. Accordingly, each of the units 50A-50B and 52 may be referred to as a pipe. Thus, the user interface units 50A-50B may be user interface pipes or static frame/image pipes. The video unit 52 may be referred to as a video pipe or video sequence pipe.

While the display pipe 16 is an example of an embodiment in which the technique of using data that is within a unit but not yet processed to determine QoS levels and/or clock gating in the unit, other embodiments may implement other types of units. For example, the ISP may implement a similar mechanism. In the case of the ISP, it is a potential output buffer overflow for data that is to be written to memory that is to be avoided. Accordingly, comparisons may be made to thresholds to be exceeded in order to increase QoS levels in such a case.

In general, then, an apparatus that implements the mechanisms described herein may include multiple processing units, each configured to process data read from memory and each including one or more buffers. The apparatus may further include an output buffer configured to store output data from the processing units. A control circuit may be coupled to the output buffer and the processing units. The processing units may be configured to provide a value to the control circuit indicative of an equivalent amount of output data represented by the data stored in the one or more buffers in that processing unit, and the control circuit is configured to select a smallest value of the values. The selected value may be added to a corresponding second value measuring an amount of output data stored in the output buffer to produce a sum, which a QoS circuit coupled to the control unit may compare to one or more thresholds corresponding to the QoS levels. The QoS circuit may be configured to determine a QoS level for subsequent read memory transactions to read data for the plurality of processing units responsive to a result of the comparison of the sum to the one or more thresholds.

Figure 3:
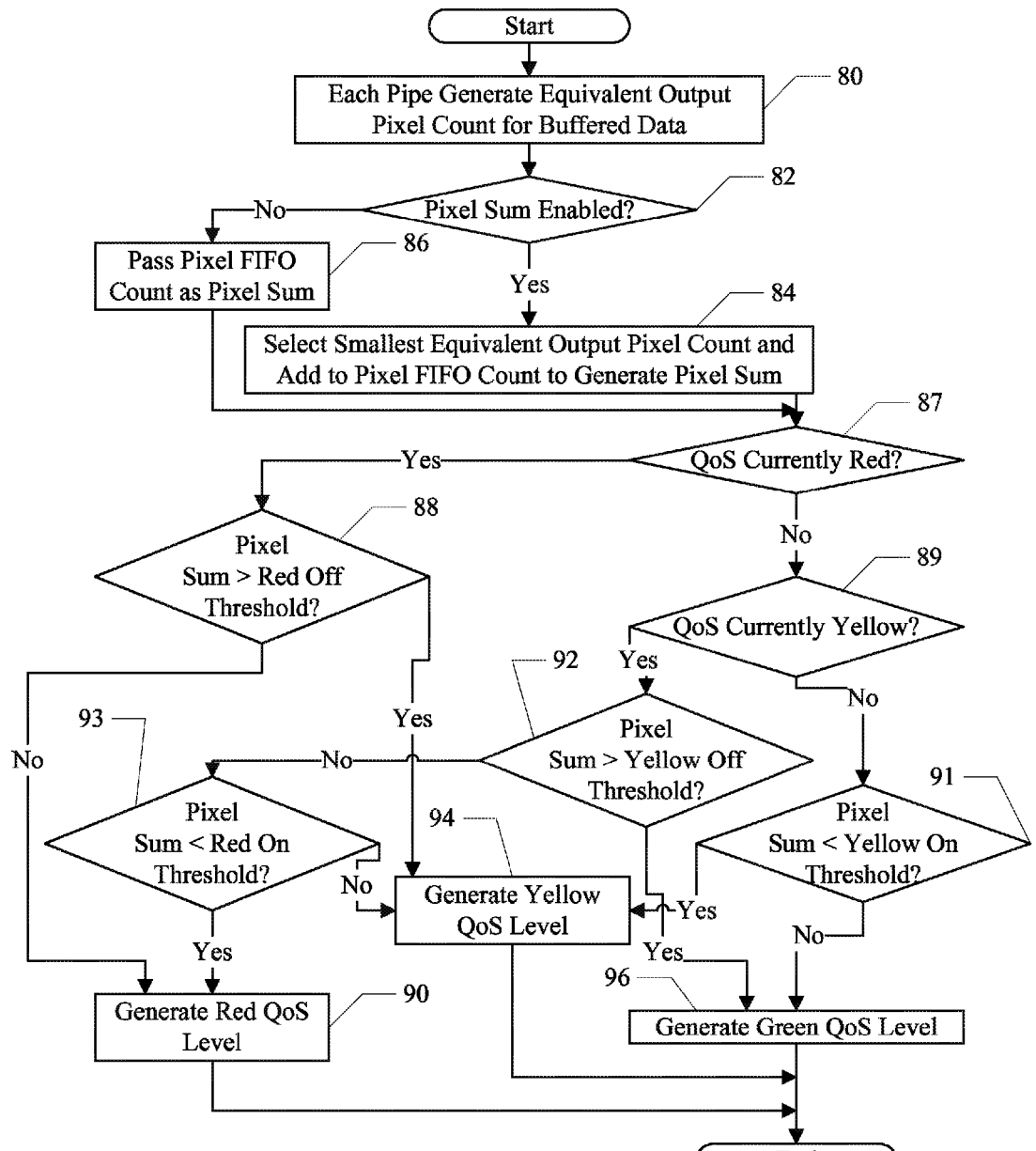
FIG. 3 is a flowchart illustrating operation of portions of one embodiment of the display pipe shown in FIG. 1 for QoS level assignment.

Turning next to FIG. 3, a flowchart is shown illustrating operation of one embodiment of the display pipe 16A shown in FIG. 2 for QoS level determination/assignment. While the blocks are shown in a particular order for ease of understanding, other orders may be used. Blocks may be performed in parallel in combinatorial logic in then display pipe 16A. Blocks, combinations of blocks, and/or the flowchart as a whole may be pipelined over multiple clock cycles. The display pipe 16A and/or components thereof shown in FIG. 2 may be configured to implement the operation shown in FIG. 3.

Each pipe/unit 50A-50B and 52 may generate an equivalent output pixel count for any buffered data within the pipe/unit (block 80). If pixel summing is enabled in the pixel sum generator circuit 70 (decision block 82, "yes" leg), the pixel sum generator circuit 70 may be configured to select the smallest equivalent output pixel count from the counts provided by the pipes 50A-50B and 52, and may add the selected count to the pixel FIFO count to generate the pixel sum (block 84). If pixel summing is disabled (decision block 82, "no" leg), the pixel sum generator circuit 70 may pass the pixel FIFO count as the pixel sum (block 86).

Because the present embodiment implements hysteresis, the current QoS level (or the most recently determined QoS level) is a factor in the determination of the QoS level for a given request. Embodiments that do not implement hysteresis may determine QoS level based only on the threshold levels, and there may be only one threshold level per QoS level. If the QoS level is currently red (decision block 87, "yes" leg), then the QoS level may remain red until the pixel sum drops below the red off threshold. If the pixel sum is greater than the red off threshold (decision block 88, "yes" leg), the QoS control circuit 72 may generate a yellow QoS level (block 94). If the pixel sum is less than the red off threshold (decision block 88, "no" leg), the QoS control circuit 72 may generate a red QoS level (block 90). If the QoS level is not currently red (decision block 87, "no" leg) but is currently yellow (decision block 89, "yes" leg) and the pixel sum is greater than the yellow off threshold (decision block 92, "yes" leg), the QoS control circuit 72 may generate the green QoS level (block 96). If the QoS level is not currently red (decision block 87, "no" leg) but is currently yellow (decision block 89, "yes" leg), the pixel sum is not greater than the yellow off threshold (decision block 92, "no" leg), and the pixel sum is less than the red on threshold (decision block 93, "yes" leg), the QoS control circuit 72 may generate the red QoS level (block 90). If the QoS level is not currently red (decision block 87, "no" leg) but is currently yellow (decision block 89, "yes" leg), the pixel sum is not greater than the yellow off threshold (decision block 92, "no" leg), and the pixel sum is greater than the red on threshold (decision block 93, "no" leg), the QoS control circuit 72 may generate the yellow QoS level (block 94). If the QoS level is not currently red (decision block 87, "no" leg) but is currently yellow (decision block 89, "yes" leg) and the pixel sum is greater than the yellow off (decision block 92, "yes" leg), the QoS control circuit 72 may generate the green QoS level (block 96). If the current QoS level is neither red nor yellow (i.e. it is green, decision blocks 87 and 89, "no" legs), and the pixel sum is less than the yellow on threshold (decision block 91, "yes" leg), the QoS control circuit 72 may generate a yellow QoS level (block 94). Finally, if the QoS level is currently green (decision blocks 87 and 89, "no" legs), and the pixel sum is greater than the yellow on threshold (decision block 91, "no" leg), the QoS control circuit 72 may generate a green QoS level (block 96).

Figure 4:
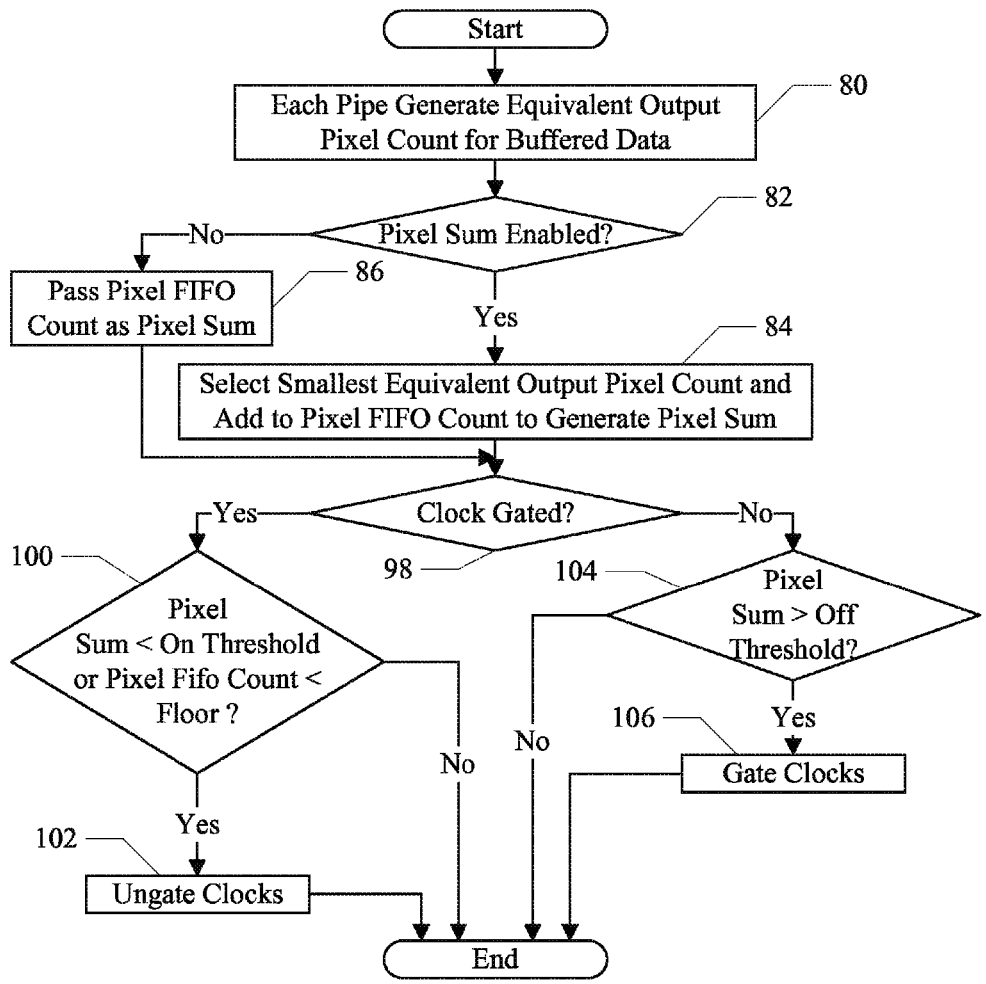
FIG. 4 is a flowchart illustrating operation of portions of one embodiment of the display pipe shown in FIG. 1 for clock gating.

Turning next to FIG. 4, a flowchart is shown illustrating operation of one embodiment of the display pipe 16A shown in FIG. 2 for clock gating. While the blocks are shown in a particular order for ease of understanding, other orders may be used. Blocks may be performed in parallel in combinatorial logic in then display pipe 16A. Blocks, combinations of blocks, and/or the flowchart as a whole may be pipelined over multiple clock cycles. The display pipe 16A and/or components thereof shown in FIG. 2 may be configured to implement the operation shown in FIG. 4.

Similar to the flowchart of FIG. 3, the flowchart of FIG. 4 includes the pixel sum generation. In one embodiment, pixel sum generation may be separately enabled/disabled for clock gating and for QoS level generation. Accordingly, the pixel sum generation of FIG. 4 may be independent of the pixel sum generation of FIG. 3. In other embodiments, pixel sum generation may not be separately enabled/disabled and the pixel sum generation illustrated in FIG. 4 may be the same as the pixel sum generation in FIG. 3. Each pipe/unit 50A-50B and 52 may generate an equivalent output pixel count for any buffered data within the pipe/unit (block 80). If pixel summing is enabled in the pixel sum generator circuit 70 (decision block 82, "yes" leg), the pixel sum generator circuit 70 may be configured to select the smallest equivalent output pixel count from the counts provided by the pipes 50A-50B and 52, and may add the selected count to the pixel FIFO count to generate the pixel sum (block 84). If pixel summing is disabled (decision block 82, "no" leg), the pixel sum generator circuit 70 may pass the pixel FIFO count as the pixel sum (block 86).

If a portion of the display pipe 16A is currently clock gated (decision block 98, "yes" leg), the clock gate control circuit 74 may determine if the pixel sum is less than the on (or awaken) threshold (decision block 100). If so (decision block 100, "yes" leg), the clock gate control circuit 74 may generate clock gate controls to ungate the clocks (block 102). Additionally, in this embodiment, a floor based only on the pixel FIFO count may be supported (and may be programmed into the threshold registers 76B). If the pixel FIFO count is less than the floor (decision block 100, "yes" leg), the clock gate control circuit 74 may generate clock gate controls to ungate the clocks (block 102). If the pixel sum is greater than the on threshold and the pixel FIFO count is greater than the floor (decision block 100, "no" leg), clocks may remain gated. On the other hand, if the portion of the display pipe 16A is not currently clock gated (decision block 98, "no" leg), the clock gate control circuit 74 may determine if the pixel sum is greater than the off threshold (decision block 104). If so (decision block 104, "yes" leg), the clock gate control circuit 74 may generate clock gate controls to gate the clocks (block 106). If not (decision block 104, "no" leg), clocks may remain ungated.

Figure 5:
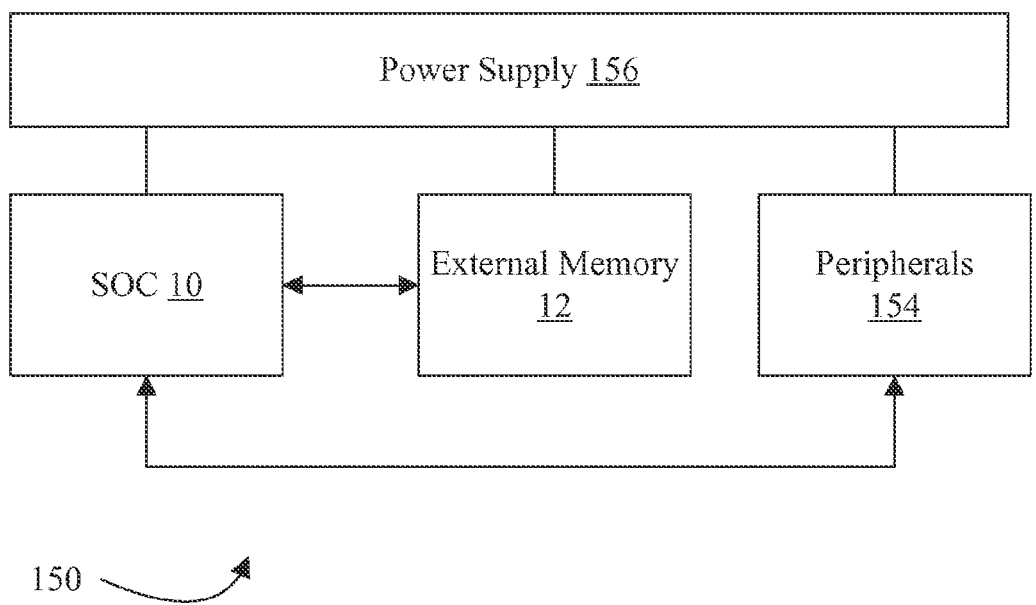
FIG. 5 is a block diagram of one embodiment of a system including the SoC shown in FIG. 1.

Turning next to FIG. 5, a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A method comprising:
   determining a plurality of numbers of equivalent output pixels in data stored in a plurality of buffers in a display pipe that prepares frames of pixels to be transmitted to a display from one or more input frames and one or more video sequences, wherein the data stored in the plurality of buffers was read from a memory in response to one or more data fetches transmitted to the memory by the display pipe;
   selecting a smallest number of the plurality of numbers of equivalent output pixels;
   adding the smallest number to a number of pixels in a pixel buffer at an output of the display pipe to generate a pixel sum; and
   determining a quality of service (QoS) level for subsequent data fetches to the memory from the display pipe responsive to the pixel sum.

2. The method as recited in claim 1 wherein determining the plurality of numbers of equivalent output pixels is dependent on a pixel size for an input frame from which data is stored in a given one of the plurality of buffers.

3. The method as recited in claim 1 wherein determining the quality of service (QoS) level comprises comparing the pixel sum to a plurality of thresholds, each of the plurality of thresholds corresponding to a different QoS level, wherein the QoS level resulting from the determining corresponds to the lowest of the plurality of thresholds below which the pixel sum falls.

4. The method as recited in claim 1 further comprising:
   clock gating a portion of the display pipe; and
   determining that clock gating is to be discontinued responsive to comparing the number of pixels to a first clock gating threshold.

5. The method as recited in claim 4 wherein clock gating is initiated responsive to comparing the pixel sum to a second clock gating threshold.

6. An apparatus comprising:
   a plurality of processing units, each of the plurality of processing units coupled to receive data read from memory and to process the data, each of the plurality of processing units further including one or more buffers to store the data;
   an output buffer configured to store output data from the plurality of processing units;
   a control circuit coupled to the output buffer and to the plurality of processing units, wherein each of the plurality of processing units is configured to provide a value to the control circuit indicative of an equivalent amount of output data represented by the data stored in the one or more buffers in the processing unit, and wherein the control circuit is configured to select a smallest value of the values provided by the plurality of processing units and to add the smallest value to a corresponding second value measuring an amount of output data stored in the output buffer to produce a sum; and
   a quality of service (QoS) circuit coupled to the control unit, wherein the QoS circuit is configured to compare the sum to one or more thresholds corresponding to a plurality of QoS levels, and wherein the QoS circuit is configured to determine a QoS level for subsequent read memory transactions to read data for the plurality of processing units responsive to a result of the comparison of the sum to the one or more thresholds.

7. The apparatus as recited in claim 6 wherein the plurality of processing units comprise video processing units, and wherein the data stored in the one or more buffers comprises image data.

8. The apparatus as recited in claim 7 wherein the output buffer is a pixel buffer storing pixels to be transmitted to a display, and wherein the second value is a pixel count of pixels in the pixel buffer.

9. The apparatus as recited in claim 8 further comprising a blend unit configured to blend output pixels from the plurality of video processing units to generate pixels for storage in the pixel buffer.

10. The apparatus as recited in claim 9 wherein the value from a given processing unit of the plurality of processing units is a count of equivalent pixels represented by the data in the one or more buffers in the given processing unit.

11. The apparatus as recited in claim 10 wherein the video processing units are configured to estimate the number of equivalent pixels in the data based on a current pixel size.

12. The apparatus as recited in claim 7 wherein the plurality of video processing units comprise a first video processing unit configured to process a static frame of data, and wherein the one or more buffers comprise line buffers storing input data to the first video processing unit arranged as lines of pixels from the static image, and wherein the value from the first video processing unit is a count of equivalent pixels in the line buffers.

13. The apparatus as recited in claim 7 wherein the plurality of video processing units comprise a first video processing unit configured to process a video sequence, and wherein the one or more buffers comprise a video output buffer storing frame data corresponding to a frame in the video sequence, and wherein the value from the first video processing unit is a count of pixels in the video output buffer.

14. The apparatus as recited in claim 6 wherein the QoS circuit is configured to implement hysteresis for each QoS level.

15. A display pipe unit comprising:
one or more first pipes configured to process static frames for display;
one or more second pipes configured to process video sequences for display;
a blend unit coupled to receive pixels from the one or more first pipes and the one or more second pipes, the blend unit configured to blend pixels from the one or more first pipes and the one or more second pipes to generate output pixels;
a pixel buffer configured to store the output pixels for transmission to a display; and
a control circuit coupled to receive a first count of output pixels in the pixel buffer and coupled to receive an indication of output equivalent pixels within data stored in one or more buffers in each of the first pipes and the second pipes responsive to one or more data reads issued by the display pipe unit, and wherein the control circuit is configured to generate a pixel count responsive to the first count and the indications, wherein a quality of service (QoS) level to be requested for subsequent data reads from the display pipe unit is determined from the pixel count.

16. The display pipe unit as recited in claim 15 wherein the one or more first pipes and the one or more second pipes are each configured to generate an output equivalent pixel count corresponding to data stored in the buffers within that first pipe or second pipe, and wherein the indication received by the control circuit is the output equivalent pixel count from each of the first pipes and second pipes.

17. The display pipe unit as recited in claim 15 the indication from a given pipe of the first pipes and the second pipes is a count of data in a corresponding buffer of the one or more buffers in the given pipe, and the control circuit is configured to generate an output equivalent pixel count from the count of data and one or more attributes of images being processed.

18. The display pipe unit as recited in claim 15 where a number of output equivalent pixels is determined from an amount of data in a corresponding buffer and one or more attributes of images being processed.

19. The display pipe unit as recited in claim 18 wherein the one or more attributes comprise a pixel size.

20. The display pipe unit as recited in claim 18 wherein the one or more attributes comprise a scale factor.

* * * * *